(12) United States Patent
Drangmeister et al.

(10) Patent No.: US 11,463,017 B2
(45) Date of Patent: Oct. 4, 2022

(54) 3-STAGE ACTIVE NEUTRAL POINT CLAMPED (ANPC) HYBRID CONVERTER

(71) Applicant: KACO new energy GmbH, Neckarsulm (DE)

(72) Inventors: Harald Drangmeister, Heilbronn (DE); Sven Meissinger, Sinsheim (DE); Sebastian Hess, Ludwigsburg (DE); Gennadi Starobinski, Kassel (DE)

(73) Assignee: KACO new energy GmbH, Neckarsulm (DE)

( * ) Notice: Subject to any disclaimer, the term of this patent is extended or adjusted under 35 U.S.C. 154(b) by 0 days.

(21) Appl. No.: 17/293,125

(22) PCT Filed: Oct. 31, 2019

(86) PCT No.: PCT/EP2019/079921
§ 371 (c)(1),
(2) Date: May 12, 2021

(87) PCT Pub. No.: WO2020/099145
PCT Pub. Date: May 22, 2020

(65) Prior Publication Data
US 2022/0014112 A1 Jan. 13, 2022

(30) Foreign Application Priority Data
Nov. 12, 2018 (DE) .......................... 102018219270.7

(51) Int. Cl.
*H02M 7/487* (2007.01)
*H02M 7/537* (2006.01)
*H02M 1/00* (2006.01)

(52) U.S. Cl.
CPC ......... *H02M 7/487* (2013.01); *H02M 1/0095* (2021.05); *H02M 7/537* (2013.01)

(58) Field of Classification Search
CPC combination set(s) only.
See application file for complete search history.

(56) References Cited

U.S. PATENT DOCUMENTS

| 6,697,274 B2 | 2/2004 | Bernet et al. |
| 2003/0048650 A1 | 3/2003 | Asaeda et al. |

(Continued)

FOREIGN PATENT DOCUMENTS

| CN | 105186902 A | 12/2015 |
| DE | 10140747 A1 | 3/2002 |

(Continued)

OTHER PUBLICATIONS

Zhang Di et al: "Three-level two-stage decoupled active NPC converter with Si IGBT and SiC MOSFET"; In: 2017 IEEE Energy Conversion Congress and Exposition (ECCE); 2017; Conference Paper; pp. 5671-5678; URL:https:ieeexplore.org [retrived on Aug. 19, 2019].

(Continued)

*Primary Examiner* — Gary A Nash
(74) *Attorney, Agent, or Firm* — Laurence A. Greenberg; Werner H. Stemer; Ralphe E. Locher

(57) ABSTRACT

An active neutral point clamped topology based converter includes a plurality of input terminals, an output terminal, a choke, a plurality of switching devices and a control unit. The control unit generates control signals for the switching devices of the converter in such that an SiC switch can be used with low reverse voltage.

10 Claims, 2 Drawing Sheets

(56) References Cited

U.S. PATENT DOCUMENTS

| | | |
|---|---|---|
| 2011/0115532 A1 | 5/2011 | Roesner et al. |
| 2011/0193412 A1* | 8/2011 | Lacarnoy ............. H02M 7/487 307/75 |
| 2013/0088901 A1* | 4/2013 | Bleus ................... H02M 7/515 363/71 |
| 2017/0185130 A1* | 6/2017 | Zhang ................... H02M 7/483 |
| 2017/0310238 A1* | 10/2017 | Fu ..................... H02M 7/53871 |
| 2017/0373586 A1 | 12/2017 | Zhang et al. |
| 2017/0373589 A1 | 12/2017 | Saint-Pierre et al. |
| 2018/0316276 A1 | 11/2018 | Zhuang et al. |

FOREIGN PATENT DOCUMENTS

| | | |
|---|---|---|
| EP | 2372893 A1 | 10/2011 |
| EP | 3188355 A1 | 7/2017 |
| EP | 3301804 A1 | 4/2018 |
| EP | 3396840 A1 | 10/2018 |
| JP | H05211776 A | 8/1993 |

OTHER PUBLICATIONS

Guan Qing-Xin et al.; "An Extremely High Efficient Three-Level Active Neutral-Point-Clamped Converter Comprising SiC and Si Hybrid Power Stages"; IEEE Transactions on Power Electronics; Bd. 33; No. 10; pp. 8341-8352, XP011687290; ISSN: 0885-8993; DOI: 10.1109/TPEL.2017.2784821; 2018.

Mutschler, Peter, "Wechselrichter fuer Photovoltaikanlagen" [Inverter for photovoltaic systems], Lecture Series on Renewable Energies in the summer semester 1994, TU Darmstadt, HEAG Hess Elektrizitaets AG, Energie Verlag Heidelberg, English machine translation of the Summary (p. 17).

* cited by examiner

3-STAGE ACTIVE NEUTRAL POINT CLAMPED (ANPC) HYBRID CONVERTER

BACKGROUND OF THE INVENTION

Field of the Invention

The invention relates to a power converter.

The publication Qing-Xin Guan et al. "An Extremely High Efficient Three-Level Active Neutral-Point-Clamped Converter Comprising SiC and Si Hybrid Power Stages" in IEEE TRANSACTIONS ON POWER ELECTRONICS, VOL. 33, No. 10, OCTOBER 2018, pages 8341-8352, describes a converter in the form of a multilevel converter.

SUMMARY OF THE INVENTION

The object of the invention is to provide a converter that extends the multilevel converter described in the publication by Qing-Xin Guan et al. in an advantageous way.

The invention achieves this object by means of a converter as described below.

The converter or multilevel converter is designed in particular as a photovoltaic converter and comprises: a first input terminal to which a positive DC link potential is to be applied in normal operation, a second input terminal to which a neutral potential is to be applied in normal operation, a third input terminal to which a negative DC link potential is to be applied in normal operation, an output terminal at which an output potential is present during operation of the converter, a choke, a first switching means, a second switching means, a third switching means and a fourth switching means, wherein the first switching means, the second switching means, the third switching means and the fourth switching means are inserted in series between the first input terminal and the third input terminal, and wherein a connection node of the second switching means and the third switching means is electrically connected to the second input terminal, a fifth switching means and a sixth switching means, wherein the fifth switching means and the sixth switching means are inserted in series between a connection node of the first switching means and the second switching means and a connection node of the third switching means and the fourth switching means, the choke being inserted between a connection node of the fifth switching means and the sixth switching means and the output terminal, and a control unit that is designed to activate the switching means. In this respect, the converter according to the invention is topologically equivalent to the converter or multilevel converter shown in FIG. 2a of the publication by Qing-Xin Guan et al.

According to the invention, the control unit is designed to activate the switching means before the fourth switching means is switched on, in such a manner that the fifth switching means is supplied with a voltage in the switched-off state, the magnitude of which does not exceed half of the potential difference between the positive DC link potential and the negative DC link potential, and/or the control unit is designed to activate the switching means before the first switching means is switched on, in such a manner that the sixth switching means is supplied with a voltage in the switched-off state, the magnitude of which does not exceed half of the potential difference between the positive DC link potential and the negative DC link potential.

According to one embodiment, the control unit is designed to activate the switching means before the fourth switching means is switched on, in such a manner that during a given first time interval, a potential at the connection node of the third switching means and the fourth switching means corresponds to the neutral potential. Similarly, the control unit is designed to activate the switching means before the first switching means is switched on, in such a manner that during a predefined second time interval a potential at the connection node of the second switching means and the first switching means corresponds to the neutral potential. This means that the fifth and sixth switching means is not supplied with the full DC link voltage, but only with a maximum of half of the DC link voltage.

According to one embodiment, the control unit is designed to generate a control signal for the first switching means, a control signal for the second switching means, a control signal for the third switching means, a control signal for the fourth switching means, a control signal for the fifth switching means and a control signal for the sixth switching means. In this case, the control unit comprises a signal processor and a logic unit, the signal processor being designed to directly generate the control signal for the fifth switching means and the control signal for the sixth switching means itself, and to directly generate a first basic control signal and a second basic control signal itself. The logic unit is designed to generate the control signal for the first switching means and the control signal for the third switching means from the first basic control signal and to generate the control signal for the second switching means and the control signal for the fourth switching means from the second basic control signal.

According to one embodiment, the logic unit is designed to generate a synchronous falling edge of the control signal for the first switching means and to generate a time-delayed falling edge of the control signal for the third switching means upon a falling edge of the first basic control signal, to generate a time-delayed rising edge of the control signal for the first switching means and to generate a synchronous rising edge of the control signal for the third switching means upon a rising edge of the first basic control signal, to generate a time-delayed rising edge of the control signal for the fourth switching means and to generate a rising edge of the control signal for the second switching means synchronously upon a rising edge of the second basic control signal, and to generate a time-delayed rising edge of the control signal for the fourth switching means and to generate a rising edge of the control signal for the second switching means synchronously upon a rising edge of the second basic control signal.

The activation of the switching means according to the invention requires six 6 PWM control signals per phase. In 3-phase converters operating in interleaved mode, i.e. two converters operate phase-shifted relative to each other at the same phase or interleaved, 36 PWM outputs of a signal processor (DSP) are required. However, in conventional DSPs, only a maximum of 24 PWM outputs are available. In order to provide a solution to this problem, i.e. to be able to continue to use standard DSPs, the logic unit generates the necessary additional control signals.

According to one embodiment, respective free-wheeling diodes are connected in parallel with the switching means.

According to one embodiment, the first switching means, the second switching means, the third switching means and the fourth switching means are each IGBTs, and the fifth switching means and the sixth switching means are each SiC switching means.

The invention is described in detail in the following with reference to the drawings.

DETAILED DESCRIPTION OF THE INVENTION

Figure 1:
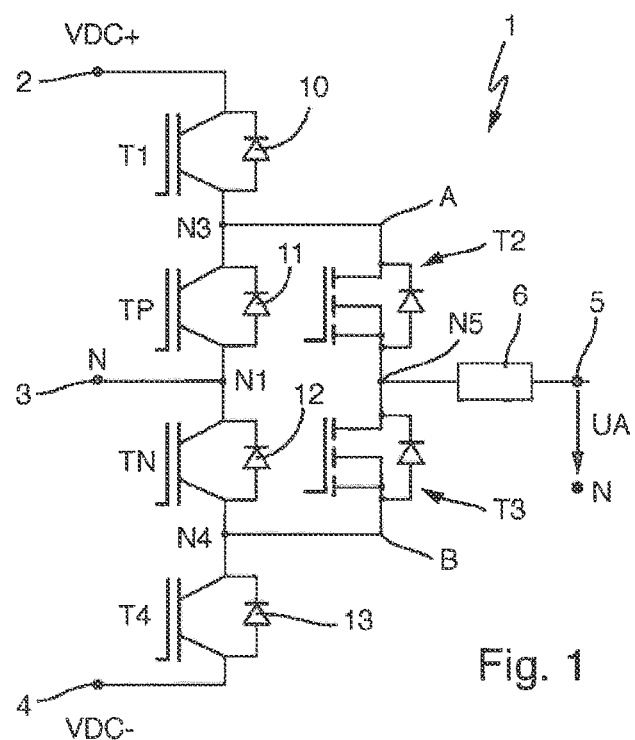
FIG. 1 shows a circuit diagram of a part of a PV converter according to the invention.

FIG. 1 shows a circuit diagram of a part of a photovoltaic (PV) converter 1 according to the invention. The PV converter comprises: a first input terminal 2 to which a positive DC link potential VDC+ is applied during operation of the converter 1, a second input terminal 3 to which a neutral potential N is applied during operation of the converter 1, a third input terminal 4 to which a negative DC link potential VDC− is applied during operation of the converter 1, an output terminal 5 at which an output potential UA is present during operation of the converter 1, a choke 6, a first semiconductor switching means T1, a second semiconductor switching means TP, a third semiconductor switching means TN, and a fourth semiconductor switching means T4, wherein the first switching means T1, the second switching means TP, the third switching means TN and the fourth switching means T4 are inserted in series between the first input terminal 2 and the third input terminal 4, and wherein a connection node N1 of the second switching means TP and the third switching means TN is electrically connected to the second input terminal 3, a fifth semiconductor switching means T2 and a sixth semiconductor switching means T3, wherein the fifth switching means T2 and the sixth switching means T3 are inserted in series between a connection node N3 of the first switching means T1 and the second switching means TP and a connection node N4 of the third switching means TN and the fourth switching means T4, the choke 5 being inserted between a connection node N5 of the fifth switching means T2 and the sixth switching means T3 and the output terminal 5, and a control unit 7, see FIG. 2, that is designed to activate the switching means T1, T2, T3, T4, TP, TN.

The respective freewheeling diodes 10, 11, 12, 13 are connected in parallel with the switching means T1, T2, T3, T4, TP, TN in the indicated switching direction.

The first switching means T1, the second switching means TP, the third switching means TN and the fourth switching means T4 are each IGBTs. The fifth switching means T2 and the sixth switching means T3 are each SiC switching means.

The topology shown in FIG. 1 corresponds to the topology shown in FIG. 2a of the publication by Qing-Xin Guan et al. However, the switching means T1, T2, T3, T4, TP, TN are activated differently from those shown in FIG. 2b there, as described in detail in the following.

Figure 2:
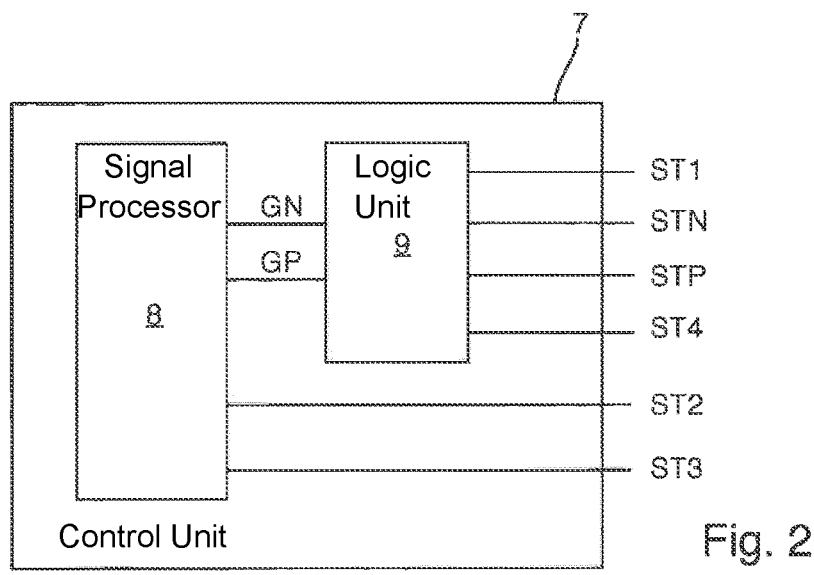
FIG. 2 shows a block circuit diagram of a control unit of the converter shown in FIG. 1

FIG. 2 shows the control unit 7, which is designed to generate a control signal ST1 for the first switching means T1, a control signal STP for the second switching means TP, a control signal STN for the third switching means TN, a control signal ST4 for the fourth switching means T4, a control signal ST2 for the fifth switching means T2, and a control signal ST3 for the sixth switching means T3.

The control unit 7 comprises a conventional signal processor 8 and a logic unit 9, wherein the signal processor 8 is designed to generate the control signal ST2 for the fifth switching means T2 and the control signal ST3 for the sixth switching means T3, and to generate a first basic control signal GN and a second basic control signal GP.

The logic unit 9 is designed to generate the control signal ST1 for the first switching means T1 and the control signal STN for the third switching means TN from the first basic control signal GN, and to generate the control signal STP for the second switching means TP and the control signal ST4 for the fourth switching means T4 from the second basic control signal GP.

Figure 3:
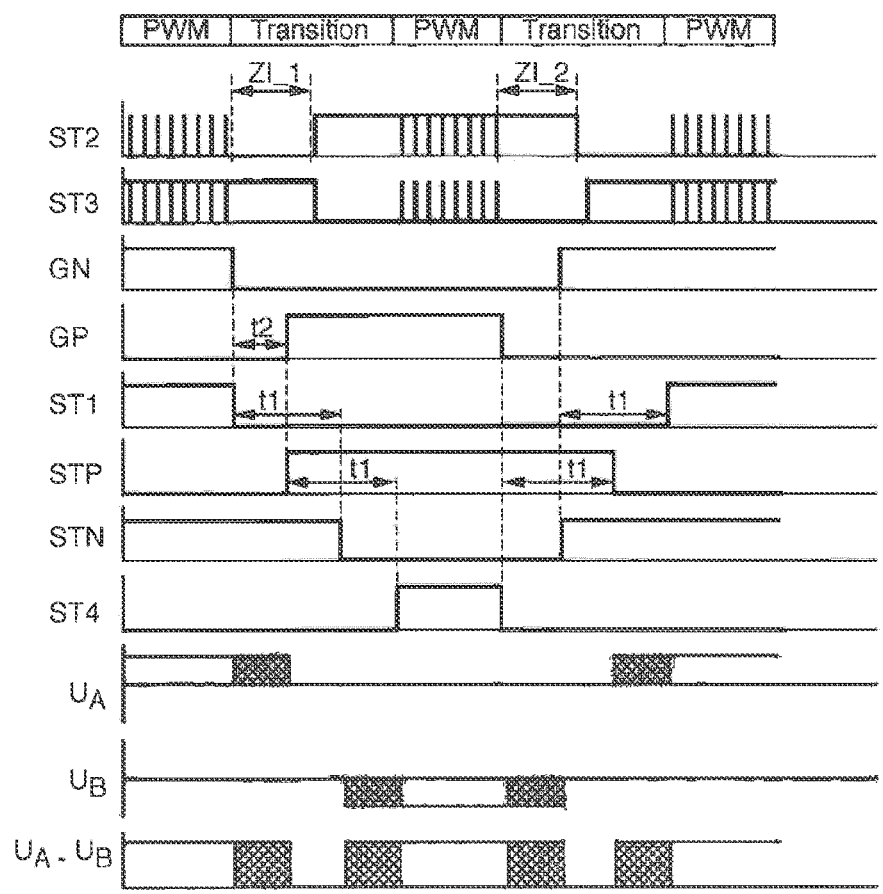
FIG. 3 shows a temporal waveform of control signals generated using the control unit shown in FIG. 2.

FIG. 3 shows a temporal waveform of the above-mentioned control signals.

In the time intervals labeled with PWM, the switching means T2 and T3 are activated according to a PWM scheme, such as that described in the publication by Qing-Xin Guan et al., for example.

In the time intervals labeled with Transition, all of the switching means T1, T2, T3, T4, TP, TN are activated in such a manner that the fifth switching means T2 is supplied with a voltage in the switched-off state, the magnitude of which does not exceed half of the potential difference between the positive DC link potential VDC+ and the negative DC link potential VDC−, and that the sixth switching means T3 is supplied with a voltage in the switched-off state, the magnitude of which does not exceed half of the potential difference between the positive DC link potential VDC+ and the negative DC link potential VDC−.

The control signals are generated in such a way that, before the fourth switching means T4 is switched on, the switching means T1, T2, T3, T4, TP, TN are in a switching state such that during a first predefined time interval ZI_1 a potential at the connection node N4 of the third switching means TN and the fourth switching means T4 corresponds to the neutral potential N. Similarly, before the first switching means T1 is switched on, the control signals are generated in such a way that the switching means T1, T2, T3, T4, TP, TN are in a switching state such that during a predefined second time interval ZI_2 a potential at the connection node N3 of the second switching means TP and the first switching means T1 corresponds to the neutral potential N.

The logic unit 9 is designed to generate a synchronous falling edge of the control signal ST1 for the first switching means T1 and to generate a falling edge of the control signal STN for the third switching means TN time-delayed by a time delay t1 upon a falling edge of the first basic control signal GN, and to generate a rising edge of the control signal ST1 for the first switching means T1 time-delayed by ii the time delay t1 and to generate a rising edge of the control signal STN for the third switching means TN synchronously upon a rising edge of the first basic control signal GN.

The logic unit 9 is additionally designed to generate a synchronous falling edge of the control signal ST4 for the fourth switching means T4 and to generate a falling edge of the control signal STP for the second switching means TP time-delayed by the time delay t1 upon a falling edge of the second basic control signal GP, and to generate a rising edge of the control signal ST4 for the fourth switching means T4 time-delayed by the time delay t1 and to generate a rising edge of the control signal STP for the second switching means TP synchronously upon a rising edge of the second basic control signal GP.

The control signals ST1 and STN for the switching means T1 and TN are based on the first basic control signal GN and the control signals ST4 and STP for the switching means T4 and TP are based on the second basic control signal GP. However, the control signal ST1 for the switching means T1 is switched on with a time delay and switched off without a time delay. The control signal STN for the switching means TN is switched on without a time delay and switched off with a time delay. The delay must be equal to at least twice the value of a dead time t2. This ensures that the switching means TP and TN are switched on together for at least a single dead time t2 during the switching process.

According to the publication by Qing-Xin Guan et al., the same control signal is applied to the switching means T1 and Tn and the same control signal is applied to the switching means T4 and Tp, see "Table 1" there. However, this inevitably leads to the entire DC link voltage being applied to the switching means T2 and T3 for certain switching state sequences. This requires the reverse voltage of the switching means to be increased to the extent that they can block the entire DC link voltage. This in turn requires semiconductors with correspondingly higher reverse voltage. However, these have a larger surface area for the same transmission losses. A larger surface area in turn means higher costs. Furthermore, semiconductors of this kind have poorer dynamic properties, which leads to higher switching losses.

According to the invention, during the changeover from positive output voltage to negative output voltage, the node TN/T3 to T4 is temporarily held or clamped at the DC link neutral N. Similarly, during the changeover from negative output voltage to positive output voltage, the node TP/T2 to T1 is temporarily held or clamped at the DC link neutral N. This means that the switching means T2 and T3 means are not supplied with the full DC link voltage, but only with a maximum of half the DC link voltage. This means that semiconductors with correspondingly smaller reverse voltages can be used as switching means.

A plurality, in particular two, of the converters 1 shown in FIG. 1 can be connected in parallel, which are then operated in interleaved mode or with a phase offset.

The DC link voltage can conventionally be generated by a suitable DC source, for example by one or more solar panels. The output potential or output voltage UA can be fed into the grid in the conventional way.

The invention claimed is:

1. A converter, comprising:
   a first input terminal to which a positive DC link potential is to be applied during operation of the converter;
   a second input terminal to which a neutral potential is to be applied during operation of the converter;
   a third input terminal to which a negative DC link potential is to be applied during operation of the converter;
   an output terminal from which an output potential is to be output during operation of the converter;
   a first switching device, a second switching device, a third switching device and a fourth switching device, said first switching device, said second switching device, said third switching device and said fourth switching device being inserted in series between said first input terminal and said third input terminal, and a connection node of said second switching device and of said third switching device being electrically connected to said second input terminal;
   a fifth switching device and a sixth switching device, said fifth switching device and said sixth switching device being inserted in series between a connection node of said first switching device and said second switching device and a connection node of said third switching device and said fourth switching device;
   a choke inserted between a connection node of said fifth switching device and said sixth switching device and said output terminal; and
   a control unit configured to activate said switching devices:
      before switching on said fourth switching device, causing said fifth switching device to be supplied in a switched-off state with a voltage having a magnitude not exceeding half of a potential difference between the positive DC link potential and the negative DC link potential, and causing a potential at said connection node of said third switching device and said fourth switching device during a first predefined time interval to correspond to the neutral potential, and
      before switching on said first switching device, causing said sixth switching device to be supplied in a switched-off state with the voltage having a magnitude not exceeding half of the potential difference between the positive DC link potential and the negative DC link potential, and causing a potential at said connection node of said second switching device and said first switching device during a predefined second time interval to correspond to the neutral potential.

2. The converter according to claim 1, wherein:
   said control unit is configured to generate a control signal for said first switching device, a control signal for said second switching device, a control signal for said third switching device, a control signal for said fourth switching device, a control signal for said fifth switching device and a control signal for said sixth switching device;
   said control unit includes a signal processor and a logic unit;
   said signal processor is configured to generate the control signal for said fifth switching device and the control signal for said sixth switching device, and to generate a first basic control signal and a second basic control signal; and
   said logic unit is configured to generate the control signal for said first switching device and the control signal for said third switching device from the basic control signal and to generate the control signal for said second switching device and the control signal for said fourth switching device from the second basic control signal.

3. The converter according to claim 2, wherein said logic unit is configured:
   to generate a synchronous falling edge of the control signal for said first switching device and to generate a time-delayed falling edge of the control signal for said third switching device upon a falling edge of the first basic control signal,
   to generate a time-delayed rising edge of the control signal for said first switching device and to generate a rising edge of the control signal for said third switching device synchronously upon a rising edge of the first basic control signal,
   to generate a synchronous falling edge of the control signal for said fourth switching device and to generate a time-delayed falling edge of the control signal for said second switching device upon a falling edge of the second basic control signal, and
   to generate a time-delayed rising edge of the control signal for said fourth switching device and to generate a rising edge of the control signal for said second switching device synchronously upon a rising edge of the second basic control signal.

4. The converter according to claim 1, which further comprises free-wheeling diodes each connected in parallel with a respective one of said switching devices.

5. The converter according to claim 1, wherein:
each of said first switching device, said second switching device, said third switching device, and said fourth switching device is a respective IGBT; and
each of said fifth switching device and said sixth switching device is a respective SiC switching device.

6. A converter, comprising:
a first input terminal to which a positive DC link potential is to be applied during operation of the converter;
a second input terminal to which a neutral potential is to be applied during operation of the converter;
a third input terminal to which a negative DC link potential is to be applied during operation of the converter;
an output terminal from which an output potential is to be output during operation of the converter;
a first switching device, a second switching device, a third switching device and a fourth switching device, said first switching device, said second switching device, said third switching device and said fourth switching device being inserted in series between said first input terminal and said third input terminal, and a connection node of said second switching device and of said third switching device being electrically connected to said second input terminal;
a fifth switching device and a sixth switching device, said fifth switching device and said sixth switching device being inserted in series between a connection node of said first switching device and said second switching device and a connection node of said third switching device and said fourth switching device;
a choke inserted between a connection node of said fifth switching device and said sixth switching device and said output terminal; and
a control unit configured to activate said switching devices at least one of:
before switching on said fourth switching device, causing said fifth switching device to be supplied in a switched-off state with a voltage having a magnitude not exceeding half of a potential difference between the positive DC link potential and the negative DC link potential, or
before switching on said first switching device, causing said sixth switching device to be supplied in a switched-off state with the voltage having a magnitude not exceeding half of the potential difference between the positive DC link potential and the negative DC link potential;
said control unit is configured to generate a control signal for said first switching device, a control signal for said second switching device, a control signal for said third switching device, a control signal for said fourth switching device, a control signal for said fifth switching device and a control signal for said sixth switching device;
said control unit includes a signal processor and a logic unit;
said signal processor is configured to generate the control signal for said fifth switching device and the control signal for said sixth switching device, and to generate a first basic control signal and a second basic control signal; and
said logic unit is configured to generate the control signal for said first switching device and the control signal for said third switching device from the basic control signal and to generate the control signal for said second switching device and the control signal for said fourth switching device from the second basic control signal.

7. The converter according to claim 6, wherein said control unit is configured to activate said switching devices before said fourth switching device is switched on, causing a potential at said connection node of said third switching device and said fourth switching device during a first predefined time interval to correspond to the neutral potential.

8. The converter according to claim 6, wherein said control unit is configured to activate said switching devices before said first switching device is switched on, causing a potential at said connection node of said second switching device and said first switching device during a predefined second time interval to correspond to the neutral potential.

9. The converter according to claim 6, which further comprises free-wheeling diodes each connected in parallel with a respective one of said switching devices.

10. The converter according to claim 6, wherein:
each of said first switching device, said second switching device, and third switching device, and said fourth switching device is a respective IGBT; and
each of said fifth switching device and said sixth switching device is a respective SiC switching device.

* * * * *